United States Patent [19]
Aoki

[11] Patent Number: 5,295,066
[45] Date of Patent: Mar. 15, 1994

[54] METHOD OF AND APPARATUS FOR CONTROLLING PRODUCTION PROCESS

[75] Inventor: Toshiaki Aoki, Itami, Japan

[73] Assignee: Mitsubishi Denki Kabushiki Kaisha, Tokyo, Japan

[21] Appl. No.: 695,047

[22] Filed: May 2, 1991

[30] Foreign Application Priority Data

May 18, 1990 [JP] Japan .............................. 2-130000

[51] Int. Cl.⁵ .............................................. G06F 15/24
[52] U.S. Cl. ..................................... 364/401; 364/402
[58] Field of Search ................... 364/401, 402, 551.01, 364/551.02, 552

[56] References Cited

U.S. PATENT DOCUMENTS 3,321,613  5/1967  Searle ............................. 364/551.01
5,093,794  3/1992  Howie et al. ..................... 364/468

OTHER PUBLICATIONS

"Rechnerintegrierte Produktionsautomatisierung" Der Elektroreker, No. 9, 1987, pp. 29-33 (translation included).

*Primary Examiner*—Roy N. Envall, Jr.
*Assistant Examiner*—Ari M. Bai
*Attorney, Agent, or Firm*—Townsend and Townsend Khourie and Crew

[57] ABSTRACT

A method of an apparatus for controlling production process which is capable of predetermining a standard production term of every process, of detecting an actual advance situation at a completion time of every process or every predetermined term, of collating the detected advance situation with the predetermined standard production term, and of detecting delay of production at every process over the standard production term. Thereby, a counterplan for recovering delay can be considered in its early stages, delay over the appointed date of delivery can be prevented before it happens, and actual results of orders in the future can be heightened. In addition, as the detection of the production delay is automatically carried out using computers or the like, the apparatus can contribute to reduction of labor.

4 Claims, 7 Drawing Sheets

Fig. 2

| ITEM | EXAMPLE |
|---|---|
| ORDER No. | 9871234 |
| MODEL No. | M1-100P |
| QUANTITY | 20,000 |
| APPOINTED DATE OF DELIVERY | 11/30/'90 |
| USER CODE | H01 |
| ORDER DATE | 11/01/'90 |
| | |

Fig. 3

| ITEM | EXAMPLE |
|---|---|
| MODEL No. | M1-100P |
| PROCESS CODE | D0101 (1st PROCESS) |
| STANDARD PRODUCTION TERM | 0.5 DAY |
| PROCESS CODE | D0102 (2nd PROCESS) |
| STANDARD PRODUCTION TERM | 0.2 DAY |
| PROCESS CODE | D0201 (3rd PROCESS) |
| STANDARD PRODUCTION TERM | 1.2 DAY |
| ⋮ | ⋮ |

Fig. 4

| ITEM | EXAMPLE |
|---|---|
| MODEL No. | M1-100P |
| LOT No. | P1A123 |
| PROCESS CODE | D0101 (1st PROCESS) |
| ACTUAL COMPLETION DATE & TIME | 11/01/'90 12:00 |
| DEVICE No. | DA01-01 |

Fig. 5

| ITEM | | | EXAMPLE | |
|---|---|---|---|---|
| MODEL No. | | | M1-100P | |
| LOT No. | | | P1A123 | |
| ORDER No. | | | 9871234 | |
| DELIVERY DATE | | | 11/30/'90 | |
| FEED DATE & TIME | | | 11/01/'90  0:00 | |
| PROCESS CODE | SCHEDULED COMPLETION DATE & TIME | 1st PROCESS D0101 | 11/01/'90  12:00 | |
| | ACTUAL COMPLETION DATE & TIME | | 11/01/'90  12:00 | |
| PROCESS CODE | SCHEDULED COMPLETION DATE & TIME | 2nd PROCESS D0102 | 11/01/'90  16:48 | |
| | ACTUAL COMPLETION DATE & TIME | | 11/01/'90  17:00 | |
| PROCESS CODE | SCHEDULED COMPLETION DATE & TIME | 3rd PROCESS D0201 | 11/02/'90  21:36 | |
| | ACTUAL COMPLETION DATE & TIME | | | |

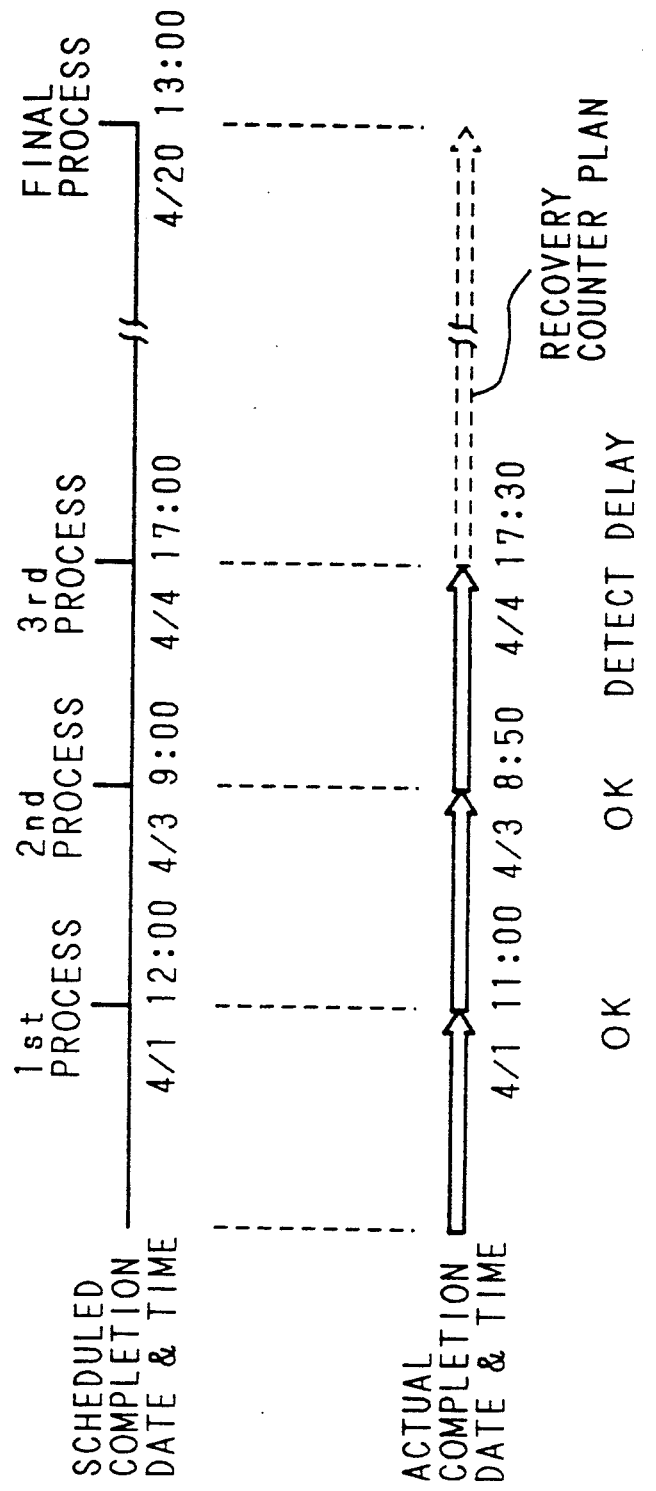

METHOD OF AND APPARATUS FOR CONTROLLING PRODUCTION PROCESS

BACKGROUND OF THE INVENTION

1. Field of the Invention

This invention relates to a method of and apparatus for controlling production process, particularly to the method and apparatus which is capable of detecting production delay at every process.

2. Description of Related Art

A producer is required to deliver products ordered by an orderer on exactly the day of delivery. Accordingly, the producer makes a production plan so that the products are in time for the day of delivery, and produces products according to the production plan.

When there is a rush order for products which was received later than the other orders, in actual, the rush order sometimes goes ahead of the other to produce the products with priority, or there are sometimes immeasurable accidents such as a trouble of a production apparatus. Thereby, production in accordance with the initial plan is not carried out and sometimes there are products which are not delivered on the delivery date. When there are such products that are not delivered on the delivery date, they cause a great annoyance to a user, lose reliance of the user, reduce orders and lower actual results of orders.

When it is not until the day after the delivery date that the fact that such products have not been shipped yet is discovered, it is too late to consider the counterplan. Accordingly, in the conventional production controlling method, in order to prevent the above, a process control table which determines a completion time and the like at every production process concerning all of the products is made and the advance situation based on the table is investigated by a man every day or every predetermined term. In the case where the production delay is discovered, a counterplan for recovering the delay is considered. The investigation of the advance situation, however, requires many persons and much time, which affects the products cost and raises the products cost.

SUMMARY OF THE INVENTION

The present invention has been devised in consideration of such circumstances, and the primary object thereof is to provide a method of and apparatus for controlling production process which is capable of detecting the production delay at every process automatically in its early stages and of surely preventing the delivery delay at low cost without man's investigating the advance situation by determining in advance the standard production term of a product at every process, by calculating the completion time of a product at every process on the basis of the determined standard production term and by comparing the calculated completion time with the actual completion time.

Another object of the present invention is to provide a method and apparatus for controlling production process which can get reliance of a user and improve the actual results of orders.

In order to attain those objects, the method for controlling production process related to the present invention calculates and stores a scheduled completion time at every process on the basis of the predetermined standard production term concerning a product, and collates the scheduled completion time with the actual advance situation and detects the production delay.

In addition, the apparatus for controlling production process related to the present invention is provided with calculating means for calculating the scheduled completion time at every process on the basis of the predetermined standard production term concerning a product, storing means for storing the calculated scheduled completion time, detecting means for detecting the advance situation at every process, and with collating means for collating the detected result by the detecting means with aforesaid scheduled completion time, the method being so constructed to detect the delay of process on the basis of the result of collating.

In the method for controlling production process related to the invention, the stored scheduled completion time at every process is collated with the actual advance situation, and production delay, when it occurs, is detected. That is to say, as the scheduled completion time at every process successively processed is collated with the actual advance situation, immediately the production delay is detected at the time when delay occurs.

Moreover, in the apparatus for controlling production process, the scheduled completion time of products at every process is calculated by the calculating means, and the result above is stored in the storing means. When the detecting means detects the advance situation every process, the collating means collates the detected result with the scheduled completion time by the storing means, and the production delay is detected on the basis of the result of collating.

The above and further objects and features of the invention will more fully be apparent from the following detailed description with accompanying drawings.

BRIEF DESCRIPTION OF THE DRAWINGS

FIG. 2 is a diagram showing input data of order input part in detail.

FIG. 3 is a diagram of input data of the standard production term input part in detail.

FIG. 4 is a diagram of input data of the process advance situation check part in detail.

FIG. 5 is a diagram of stored contents of process advance management file in detail.

FIG. 7 is a schematic diagram showing an example of detection for production delay.

DESCRIPTION OF THE PREFERRED EMBODIMENTS

Figure 1:
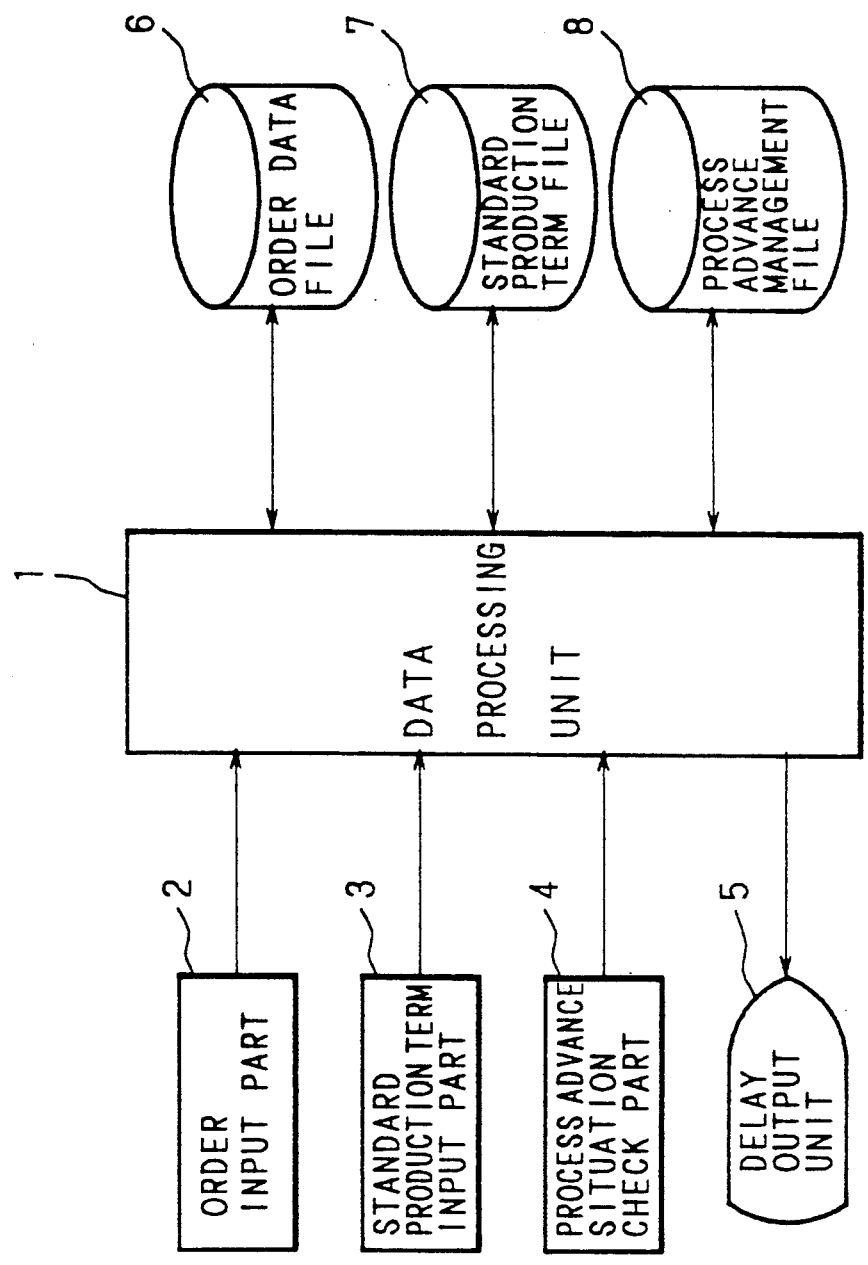
FIG. 1 is a block diagram showing the construction of the apparatus for controlling production process related to the invention.

In the following, explanation will be made on the present invention referring to drawings showing the embodiments thereof. FIG. 1 is a block diagram showing a construction of the apparatus for controlling production process related to the invention. In the drawing, reference numeral 1 is a data processing unit comprising CPU, to which respective data is given; such as an order input part 2 inputting order contents a standard production term input part 3 inputting standard production term being the processing term of products at every process, flow of process and the like, and a process advance situation check part 4 checking the process advance situation such as feeding materials at every process and state of process completion. These input data are respectively stored in an order data file 6, standard production term file 7 and process advance management file 8, and read out by the data processing unit 1 every time production delay is checked.

FIG. 2 is a diagram showing input data of the order input part 2 in detail. The order contents inputted here are the data such as order number to be numbered on each order from a user, model number shown in catalog or the like, ordered quantity, appointed date of delivery, user code, order date. The order number is to be a key code for shipment, payment, various kinds of inquiries and the like. In addition, a user usually orders by using the model number.

FIG. 3 is a diagram showing input data of the standard production term input part 3 in detail.

To the standard production term input part 3, the actual production term from the beginning to the completion of every process of every product is inputted as the standard production term from other system such as a process advance management system, for example. The standard production term is given from other system in the order of process flow of the model number M1-100P, for example, in the way that the standard production term of the first process D0101 is 0.5 day, that of the second process D0102 is 0.2 day and that of the third process is 1.2 days. To the standard production term file 7, data of the standard production term of a product at every process and process flow inputted to the standard production term input part 3 are stored.

FIG. 4 is a diagram showing input data of the process advance situation check part 4 in detail. When the processing of a product being in process (lot) has been finished data of the advance situation by the production apparatus of every process, including the completion day of the products (lot) are transmitted to the process advance situation check part 4 from each production apparatus. The advance data are, for example, model number, lot number, process code, apparatus number, completion date and the like. Data of the advance situation checked by the process advance situation check part 4 can be inputted either automatically as the above or by an operator himself.

The process advance management file 8 is formed every products being in process (lot), and is used to check production delay at every process on the basis of the stored content thereof. In the process advance management file 8, the process flow about the products ordered and the advance situation thereof are stored. FIG. 5 is a diagram of the detailed advance management file. Here, the stored contents are the data such as model number, lot number, order number and delivery date from the order input part 2, feeding data when the lot is fed to the first process, process flow and scheduled completion date and time of each process, and actual completion date and time. When the third process is in process as shown in FIG. 5, the column of the actual completion date and time is empty.

In addition, reference numeral 5 shown in FIG. 1 is a delay output unit for informing an operator of the production delay. The delay output unit 5 comprises, for example, a lamp installed at each production apparatus, a pocket bell held by a person in charge of the process advance management, and an output apparatus such as CRT or the like of a centralized supervisory system which supervises the whole production processes. When the lamp is used, it is turned on to indicate the production delay to the production apparatus which have processed aforesaid lot. When the pocket bell is used, a signal showing the production delay is outputted to ring the bell or to display the fact. In addition, when CRT is used at the delay output unit 5, model number, lot number, order number, delivery date, scheduled completion date and time at each process, actual completion date and time, possible date for shipping the delayed products and the like are indicated in the CRT. To the delay output part 5, an output signal is transmitted from the data processing unit 1 when the production delay is detected according to a method to be described later.

Figure 6:
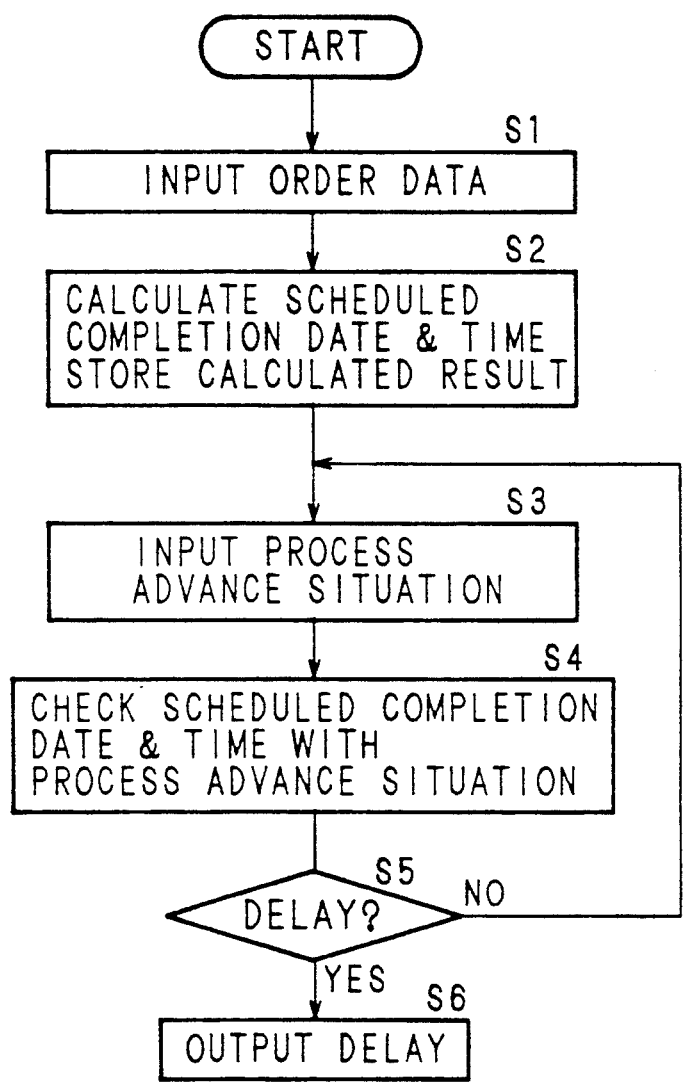
FIG. 6 is a flowchart showing detecting procedure of production delay.

Next explanation will be made on procedures for detecting the production delay by means of the apparatus of the present invention constructed as the above, referring to flowchart shown in FIG. 6.

At first, the standard production term of products and process flow are inputted in the data processing unit 1 in advance by the standard production term input part 3, and stored in the standard production term file 7.

In step 1, the data processing unit 1 stores the order contents inputted by the order input part 2 into the order data file 6.

Next, the data processing unit 1 respectively reads out the delivery date from the order data file 6 and the standard production term and process flow from the standard production term file 7, and calculates the scheduled completion date and time at each process. Here, the scheduled completion date and time should be the latest within the allowable range at each process, and the data of the calculated scheduled completion date and time at each process is stored in the process advance management file 8 (step 2).

According to the processings mentioned above, preparation is made to produce products, then production is started to process the step 3 and steps thereafter.

At first, in step 3, check data of advance situation of a process are inputted from the process advance situation check part 4. The check data are inputted every time a processing is finished and at every predetermined term. That is to say, even in the case where the processing is not completed due to a trouble of the production apparatus or the like, the advance situation can be seized according to the check data at every predetermined term.

In step 3, when the actual advance situation is inputted according to the process flow, the data processing unit 1 collates the advance situation with the scheduled completion date and time at the process read out from the process advance management file 8 (step 4).

On the basis of the result of collating, it is judged whether there is the production delay (step 5). When there is not, processing returns to step 3 and the data of the advance situation after that is inputted in the same way to be collated with the scheduled completion date and time.

On the other hand, where there is the production delay, processing advances to step 6 and an output is transmitted to the delay output part 5. When CRT is used in the delay output part 5, for example, data relating to a countermeasure such as appointing a preferential processing in addition to aforementioned data can be indicated.

In the process in which products are produced as above-mentioned, the advance situation over the scheduled completion date and time at each process is checked. According to the above, the production delay is checked immediately at the time when the processing is behind the scheduled completion date and time at a process.

FIG. 7 is a schematic view showing a checked example of delay according to the abovementioned checking procedure. As showing in the upper part of the figure, the scheduled completion date and time at each process is calculated and stored in advance. That is to say, the date and time of the first process is April, 1st, 12:00, that of the second process is 9:00, 3rd, that of the third process is 17:00, 4th, and that of the last process is 13:00, 20th. The lower part of the figure shows the actual completion date and time to be inputted. At first, the actual completion date and time is 11:00, 1st April, which is in time for the scheduled completion date and time, so the usual processing is to be continued. The same thing can be said about the second process. Incidentally, in the third process, the processing is finished at 17:30, 4th, which is 30 minutes behind the scheduled time. Then, at this point, delay of 30 minutes is checked and the data thereabout is outputted. After this, products are so produced as to be in time for the scheduled completion date and time of the last process.

In addition, in aforesaid example, in order to check the degree of production delay, delay is checked at the time when the processing of the third process is completed, however, when only the production delay is to be checked, it can be checked before completion according to the data input of the advance situation inputted at every predetermined term. It also possible to construct the apparatus so that the data is inputted also on the scheduled completion date and time.

As aforementioned, in the production process method of controlling production process and apparatus therefor related to the present invention, as the scheduled completion date and time at each process is calculated and stored, and the date and time is collated with the actual advance situation to check the production delay, immediately the production delay is checked at the time when production is behind the scheduled completion date and time at a certain process in a plurality of processings to be successively processed. According to this, a counterplan for recovering the production delay can be considered in its early stages, and as a result, delay of delivery can be prevented to higher the actual results of orders. In addition, as the check of production delay is automatically executed using computers or the like, it can greatly contribute to the reduction of labor.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A computer implemented method of monitoring production processing for a product to be processed successively by a plurality of processes comprising the steps of:
    setting a processing term for each process of the plurality of processes;
    calculating and storing a scheduled completion real time for each process of the plurality of processes based on said processing term;
    detecting and storing an actual completion real time for each process of the plurality of processes;
    collating, in real-time, said scheduled completion real time with said actual completion real time; and
    detecting, in real-time, a delay over the production processing according to a result of said collation of said scheduled completion real time and said actual completion real time.

2. A method of monitoring production processing as set forth in claim 1, wherein said step of collating is executed at a completion real time of each process of the plurality of processes.

3. A method of monitoring production processing as set forth in claim 1, wherein said step of collating is executed periodically.

4. A data processing apparatus for monitoring production processing for a product to be processed successively by a plurality of processes, said apparatus comprising,
    calculating means for calculating a scheduled completion real time of the product for each process of the plurality of processes based on a processing term for each process of the plurality of processes;
    storing means for storing said scheduled completion real time calculated by said calculating means;
    detecting means for detecting an actual completion real time for each process of the plurality of processes;
    collating means for collating, in real-time, said actual completion time with the scheduled completion time stored in said storing means to produce a collating result; and
    means for detecting a delay, in real-time, responsive to said collating result by said collating means.

* * * * *